United States Patent
Hill

(10) Patent No.: US 10,315,959 B2
(45) Date of Patent: Jun. 11, 2019

(54) TEMPERATURE COMPENSATED DIELECTRIC MATERIAL

(71) Applicant: SKYWORKS SOLUTIONS, INC., Woburn, MA (US)

(72) Inventor: Michael David Hill, Frederick, MD (US)

(73) Assignee: SKYWORKS SOLUTIONS, INC., Woburn, MA (US)

(*) Notice: Subject to any disclaimer, the term of this patent is extended or adjusted under 35 U.S.C. 154(b) by 0 days.

(21) Appl. No.: 15/714,934

(22) Filed: Sep. 25, 2017

(65) Prior Publication Data

US 2018/0086673 A1 Mar. 29, 2018

Related U.S. Application Data

(60) Provisional application No. 62/401,596, filed on Sep. 29, 2016.

(51) Int. Cl.
| | | |
|---|---|---|
| *C04B 35/468* | (2006.01) | |
| *C04B 35/495* | (2006.01) | |
| *C04B 35/626* | (2006.01) | |
| *C04B 35/499* | (2006.01) | |
| *C01B 13/14* | (2006.01) | |
| *C01G 23/00* | (2006.01) | |
| *H01B 3/12* | (2006.01) | |
| *C01G 33/00* | (2006.01) | |

(52) U.S. Cl.
CPC ...... *C04B 35/62675* (2013.01); *C01B 13/145* (2013.01); *C01G 23/003* (2013.01); *C01G 33/006* (2013.01); *C04B 35/4686* (2013.01); *C04B 35/499* (2013.01); *C04B 35/6262* (2013.01); *H01B 3/12* (2013.01); *C01P 2002/76* (2013.01); *C01P 2006/10* (2013.01); *C01P 2006/40* (2013.01)

(58) Field of Classification Search
CPC .......................... C04B 35/495; C04B 35/4686
See application file for complete search history.

(56) References Cited

U.S. PATENT DOCUMENTS

| | | | |
|---|---|---|---|
| 4,394,456 A | 7/1983 | Sakabe et al. | |
| 4,753,906 A | 6/1988 | Nishigaki et al. | |
| 5,105,333 A | 4/1992 | Yamano et al. | |
| 5,182,240 A | 1/1993 | Hirai et al. | |
| 5,185,304 A | 2/1993 | Hirai et al. | |
| 5,223,462 A | 6/1993 | Okawa | |
| 5,310,710 A | 5/1994 | Takase et al. | |
| 5,376,603 A | 12/1994 | Hirahara et al. | |
| 5,650,368 A | 7/1997 | Tateishi et al. | |
| 5,688,732 A | 11/1997 | Park et al. | |
| 5,750,452 A | 5/1998 | Park et al. | |
| 6,107,227 A | 8/2000 | Jacquin et al. | |
| 6,165,927 A | 12/2000 | Sato et al. | |
| 6,195,250 B1 | 2/2001 | Matoba et al. | |
| 6,304,157 B1 | 10/2001 | Wada et al. | |
| 6,429,164 B1 | 8/2002 | Wada et al. | |
| 6,458,734 B1 | 10/2002 | Sugimoto et al. | |
| 6,599,855 B2 | 7/2003 | Naito | |
| 6,844,284 B2 | 1/2005 | Tosa | |
| 7,091,147 B2 | 8/2006 | Oobuchi | |
| 8,318,623 B2 | 11/2012 | Hill | |
| 8,835,339 B2* | 9/2014 | Hill | C04B 35/4686 501/135 |
| 8,853,115 B2* | 10/2014 | Iguchi | C04B 35/495 361/321.4 |
| 8,921,248 B2* | 12/2014 | Iguchi | C04B 35/495 361/321.4 |
| 9,328,029 B2 | 5/2016 | Hill | |
| 9,755,293 B2* | 9/2017 | Hill | C04B 35/462 |
| 2011/0263411 A1* | 10/2011 | Hill | C04B 35/4686 501/137 |
| 2012/0329635 A1* | 12/2012 | Hill | C04B 35/4686 501/137 |
| 2013/0222969 A1* | 8/2013 | Iguchi | C04B 35/495 361/301.4 |
| 2015/0065332 A1* | 3/2015 | Hill | C04B 35/4686 501/139 |
| 2015/0158771 A1* | 6/2015 | Hill | C04B 35/462 333/219.1 |

FOREIGN PATENT DOCUMENTS

| | | |
|---|---|---|
| EP | 0 939 413 A1 | 9/1999 |
| EP | 0 939 979 A1 | 9/1999 |
| WO | WO 97/21642 | 6/1997 |

* cited by examiner

*Primary Examiner* — Karl E Group
(74) *Attorney, Agent, or Firm* — Knobbe Martens Olson and Bear, LLP

(57) ABSTRACT

Disclosed are embodiments of tungsten bronze crystal structures that can have both a high dielectric constant and low temperature coefficient, making them advantageous for applications that experience temperature changes and gradients. In particular, tantalum can be substituted into the crystal structure to improve properties. Embodiments of the material can be useful for radiofrequency applications such as resonators and antennas.

20 Claims, 9 Drawing Sheets

TEMPERATURE COMPENSATED DIELECTRIC MATERIAL

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

Embodiments of the disclosure relate to dielectric materials and methods of fabricating dielectric materials and, in particular, to temperature compensated dielectric ceramic materials that can be used as electronic components and methods of fabrication and use of dielectric ceramic materials.

Description of the Related Art

The quality factor (Q) is an important dimensionless factor for dielectric materials used in RF electronics such as cellular phones, biomedical devices, and RFID sensors. Currently commercially available materials have a Q in the 6000 range at 1 GHz. There is a continuing need for higher Q materials, and in particular, a need for higher Q ceramic dielectric materials with dielectric constants in the 70 to 80 range for applications such as miniaturized cavity resonators in the 500 MHz and 1 GHz range. There are currently a limited number of high Q ceramic materials that can be used in the higher frequency range. The Q of a ceramic material can be changed through a number of different ways, including changing the chemical formula of the underlying crystal structures that make up the material. However, substituting different elements into the underlying crystal structure can produce or relieve strain, thus changing the physical characteristics of the material. Some of the physical characteristic changes may not be predictable or desired.

SUMMARY

Disclosed herein are embodiments of a ceramic material comprising a tungsten bronze crystal structure modified by substituting one or more lattice sites with one or more elements selected to increase the quality factor (Q) of the material, the ceramic material thereby having a dielectric constant of at least 60 and temperature coefficient of resonant frequency of less than 15.

In some embodiments, the tungsten bronze crystal structure can be an orthorhombic tungsten bronze crystal structure. In some embodiments, the material can have the chemical formula: $Ba_{12}Sm_{28-x}Ti_{54-3x}Ta_{3x}O_{162}$ or $Ba_{12+3x}Sm_{28-3x}Ti_{54-3x}Ta_{3x}O_{162}$. In some embodiments, $0 < x < 3$. In some embodiments, x can be 0.2 giving the formula $Ba_{12.6}Sm_{27.4}Ti_{53.4}Ta_{0.6}O_{162}$.

In some embodiments, the temperature coefficient of resonant frequency can be less than 10. In some embodiments, the temperature coefficient of resonant frequency can be less than 5.

In some embodiments, the material can have no aluminum. In some embodiments, the material can have no rutile or perovskite phase.

In some embodiments, the material can be formed from a Ba—Sm—Ti—Ta—O system. In some embodiments, the material can have the composition of $Ba_{12.45}Sm_{27.65}Ti_{53.55}Ta_{0.45}O_{162}$ or $Ba_{12.15}Sm_{27.75}Ti_{53.55}Ta_{0.45}O_{162}$. In some embodiments, the material can further include $CeO_2$.

In some embodiments, the material can have a Qf at 1 GHz of at least 7000. In some embodiments, the material can have a Qf at 1 GHz of at least 8000.

Also disclosed herein are embodiments of a method of forming a temperature compensated dielectric material, the method comprising modifying a Ba—Sm—Ti—O tungsten bronze structure by inserting tantalum and adjusting barium and samarium content to balance the charges.

In some embodiments, the material can have a dielectric constant of at least 60, a Qf at 1 GHz of at least 700, and a temperature coefficient of resonant frequency of less than 15. In some embodiments, the method can further include forming a radiofrequency component from the material.

Further disclosed herein are embodiments of a radiofrequency component having a high dielectric constant and minimized temperature coefficient, the component comprising a ceramic material having a tungsten bronze crystal structure modified by substituting one or more lattice sites with one or more elements selected to increase the quality factor (Q) of the material, the ceramic material thereby having a dielectric constant of at least 60 and temperature coefficient of resonant frequency of less than 15.

In some embodiments, the component can be an antenna. In some embodiments, the component can be a resonator. In some embodiments, the material can have a dielectric constant of at least 80, a Qf at 1 GHz of at least 700, and a temperature coefficient of resonant frequency of less than 5. In some embodiments, the material can be formed from a Ba—Sm—Ti—Ta—O system.

DETAILED DESCRIPTION

Disclosed herein are embodiments of ceramics, specifically having a tungsten bronze crystal structure, that can be particularly advantageous for radiofrequency (RF) and/or microwave applications. Embodiments of these materials can have high dielectric constants while also maintaining low temperature coefficient of resonant frequency (e.g., being temperature compensated), making them particularly applicable in situations where the temperature fluctuates during operational use. In some embodiments, tantalum (Ta) can be added into the crystal structure to improve certain characteristics of the material.

Figure 1:
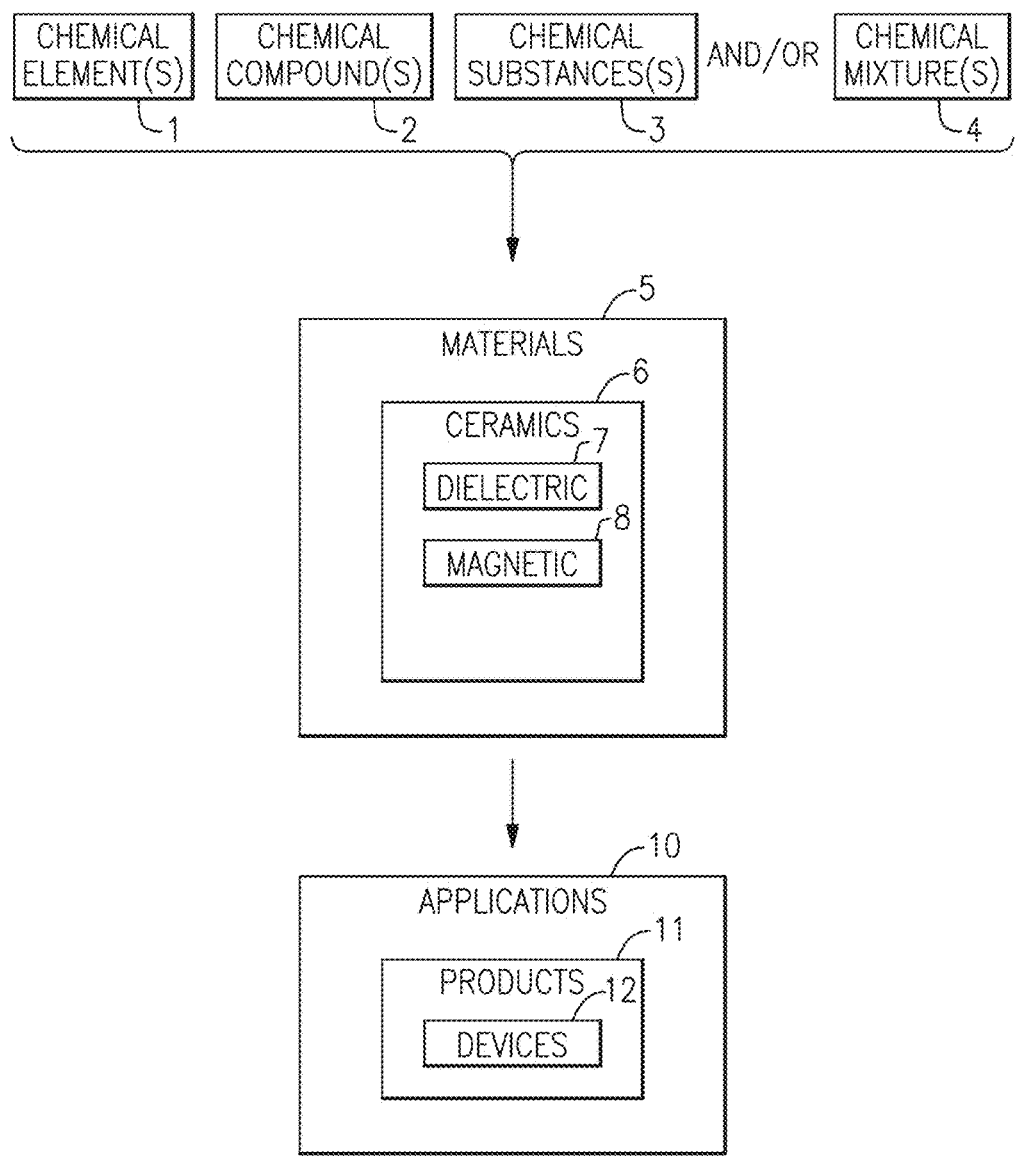
FIG. 1 schematically shows how materials having one or more features described herein can be designed, fabricated, and used.

FIG. 1 schematically shows how one or more chemical elements (block 1), chemical compounds (block 2), chemical substances (block 3) and/or chemical mixtures (block 4) can be processed to yield one or more materials (block 5) having one or more features described herein. In some embodiments, such materials can be formed into ceramic materials (block 6) configured to include a desirable dielectric property (block 7), a magnetic property (block 8).

In some embodiments, a material having one or more of the foregoing properties can be implemented in applications (block 10) such as radio-frequency (RF) application. Such applications can include implementations of one or more features as described herein in devices 12. In some applications, such devices can further be implemented in products 11. Examples of such devices and/or products are described herein.

Further disclosed herein is a framework for developing compositions and materials to expand the number of high quality factor (Q) ceramic dielectric materials available for electronic applications in the radio frequency (RF) range. Also disclosed herein are crystalline materials and compositions with high or improved Q that can be used in electronic components operating in the RF range. Also disclosed herein are methods of synthesis of crystalline materials with high or improved Q to produce the desired material and physical characteristics. The disclosed materials with high Q and methods of forming such materials can be used to improve the physical characteristics of electronic devices, such as antennas, resonators, circulators, and the like.

For electronic components operating in the RF range, some of the important physical characteristics are Q, the temperature coefficient of resonant frequency ($\tau_F$), and the dielectric constant ($\in_r$). Having the proper values for these physical characteristics allows for an electronic component to operate at an optimal level in differing environmental conditions. The disclosed materials exhibit favorable physical properties such as high or improved Q, improved dielectric constants, and a temperature coefficient of resonant frequency near 0, which are useful in the field of electronics.

Q is a dimensionless parameter that can characterize a resonator's bandwidth relative to its center frequency and can be defined as:

$$Q = 2\pi \times \frac{\text{Energy Stored}}{\text{Energy dissipated per cycle}} = 2\pi f_r \times \frac{\text{Energy Stored}}{\text{Power Loss}}.$$

Figure 2:
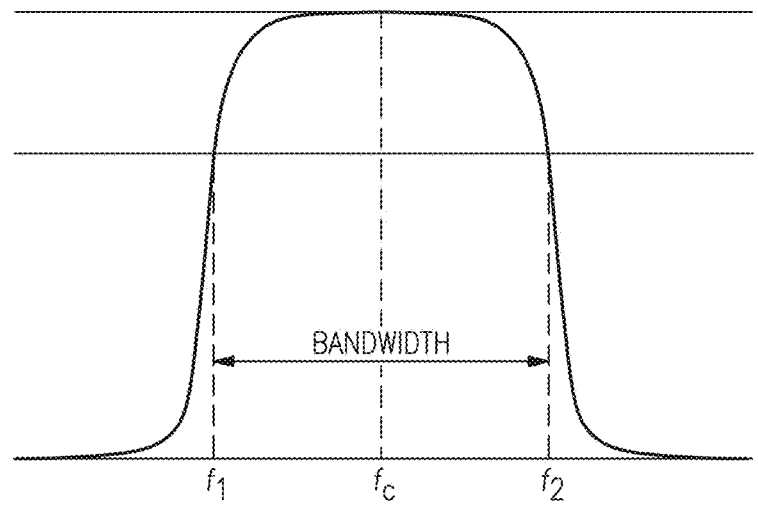
FIG. 2 illustrates a general showing of Q of a material with its bandwidth shown.

An example graph of Q is shown in FIG. 2. A system with a high Q stores a high level of energy as compared to the energy dissipated per cycle. A resonator with a high Q would resonate at greater amplitudes, but would have a small range of frequencies for resonating. Therefore, a material with a high Q would be more selective in resonating than a material with a low Q, thus allowing better filtration of other signals, but the resonator would be harder to tune due to the small range of frequencies. Moreover, a resonator with a sharp Q peak allows more channels to be inserted in a given bandwidth space. Therefore, many electronic materials are better suited when they are formed from a material with a high Q due to the lack of interference from other signals.

The temperature coefficient of resonant frequency ($\tau_F$), or temperature coefficient, embodies the relative change of resonant frequency when temperature is changed by 1K. The temperature coefficient is defined as:

$$R(T)=R(T_0)(1+\alpha \Delta T)$$

In the electronic device market, especially in the field of radio frequency, materials having a $\tau_F$ near 0 are highly sought after. The $\tau_F$, like many other physical characteristics, can change as the chemistry of the underlying material is altered. Adjusting $\tau_F$ can be done by adjusting the prevalence of certain elements within a structure, as the change of elements can cause or reduce strain on a crystal structure. A high positive or high negative value for $\tau_F$ in a material would limit the use of the material in radio frequency electronics as the resonant frequency would vary greatly based on temperature changes, thus limiting the use of a device in areas where temperatures range by a significant amount. If a $\tau_F$ value of 0 is achieved, the resonant frequency will remain constant regardless of the temperature of the material.

The dielectric constant ($\in_r$) is a dimensionless value for the relative permittivity of a material under certain conditions. It illustrates the amount of electric energy stored in a material by an applied voltage, relative to the amount stored in a vacuum. Moreover, $\in_r$ can also be used to show the ratio of capacitance using the material as compared to a capacitor in a vacuum. If a material with a high $\in_r$ is put into an electric field, the magnitude of the field will be greatly reduced within the material.

Figure 3:
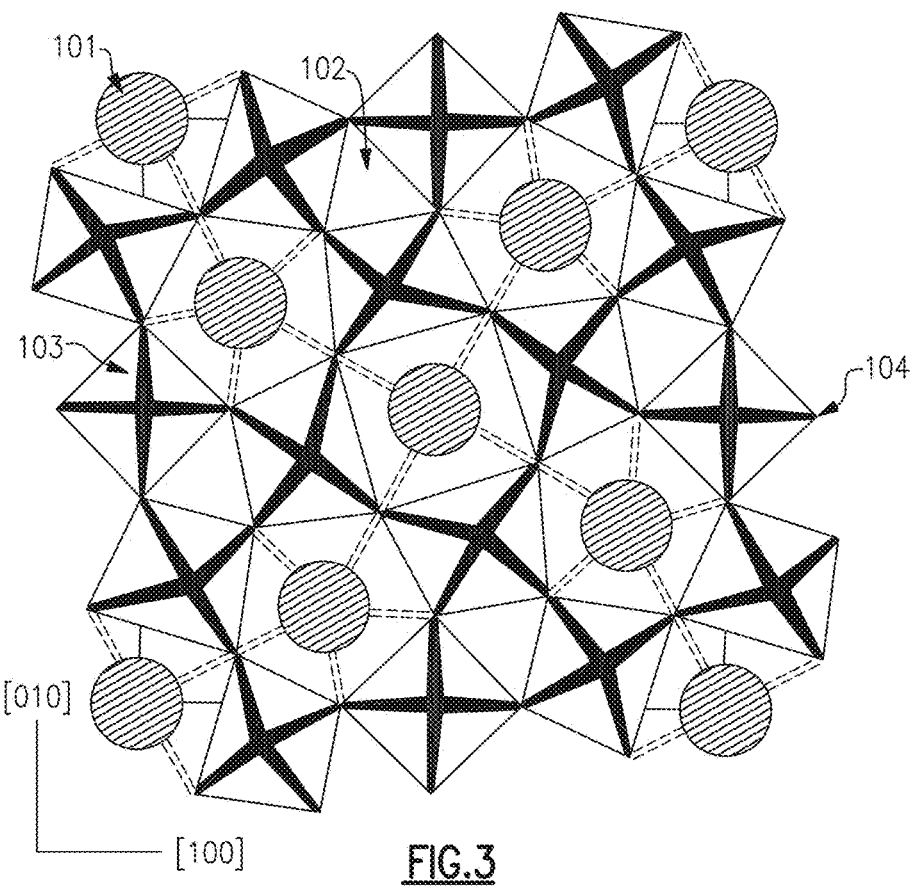
FIG. 3 illustrates the crystal structure of a generic orthorhombic tungsten bronze unit cell.

Embodiments of the present disclosure are directed to compositions and materials based on tungsten bronze crystal structures. FIG. 3 illustrates the front view of a generic orthorhombic tungsten bronze crystal structure. In three dimensions, the structure is a rectangular prism wherein the three edges all have different sizes. This differs from a tetragonal tungsten bronze (TTB) crystal structure where two of the three edges have the same dimensions. The framework of an orthorhombic tungsten bronze crystal structure includes four A type sites 101, which hold barium or other similar elements, ten B type sites 102, which hold the rare earth elements or other elements such as sodium, eighteen C type sites 103, which hold metallic elements such as titanium and aluminum, and fifty four oxygen sites 104. In an orthorhombic tungsten bronze crystal structure, the A type site is larger than the B type site which is larger than the C type sites. Different combinations of atoms in the above mentioned crystal structure can enhance certain properties within the material. However, very dissimilar sized atoms in the different sites can also negatively affect the physical characteristics of the material. If too large or too small of an element were inserted into one of the sites, strain would be placed on the crystal structure, which has the tendency to lower physical characteristics such as Q, the temperature coefficient of resonant frequency, or the dielectric constant. Therefore, to create an improved Q material, the appropriate ions must be inserted into the appropriate site in the structure.

Changes in ion size can cause bond angle shifts in a crystal structure. For example, a larger ion will reduce the tilt angle in the crystal. However, any statistical anomalies within a crystal structure, such as bond length variation due to divergent ionic sizes, can result in the drastic decrease of useful physical characteristics in crystal materials. Nevertheless, crystal materials can be positively modified by changing the octahedral tilt of the crystal structure through incorporating cationic atoms with preferred radii to provide desirable physical characteristics, such as increasing Q or improving $\tau_F$.

Along with the appropriate ion size, enhancing Q of crystalline materials may also require keeping the overall charge balance of a crystal structure at 0. Without being bound by theory, it is believed that if the charge balance strays away from neutral, physical characteristics in the crystalline material may deteriorate.

In some embodiments, the crystalline material may contain crystals with crystallographic anisotropy. If a material is anisotropic, certain physical properties of a material are directionally dependent with the crystal structure. An example of an anisotropic material is wood, which has certain properties when forces act with the grain and another set of properties when forces act against the grain. The thermal expansion coefficient, dielectric constant, and temperature coefficient of resonant frequency of the crystalline material may all depend on the crystallographic direction. Also, certain methods of formation of the crystalline material of certain preferred embodiments impart a preferred orientation to the crystal structure, which will drastically affect the physical characteristics. Certain physical characteristics of the crystalline materials may have extreme sensitivity to firing conditions, especially the temperature coefficient of resonant frequency, due to the firing imparting a certain crystallographic direction.

The physical characteristics of the crystalline material with enhanced Q can also be adjusted by incorporating modifying agents. For example, some embodiments of can involve incorporating one or more modifying agents or elements selected from the lanthanide, or rare earth metal, element series. Non-limiting examples of modifying elements include lanthanide series elements selected from yttrium, lanthanum, praseodymium, neodymium, samarium, gadolinium, dysprosium, holmium, thulium, erbium, ytterbium, or lutetium. Other non-limiting, non-lanthanide examples of modifying elements include sodium, potassium, copper, aluminum, and gallium.

Tungsten Bronze Crystal Structure

Figure 4:
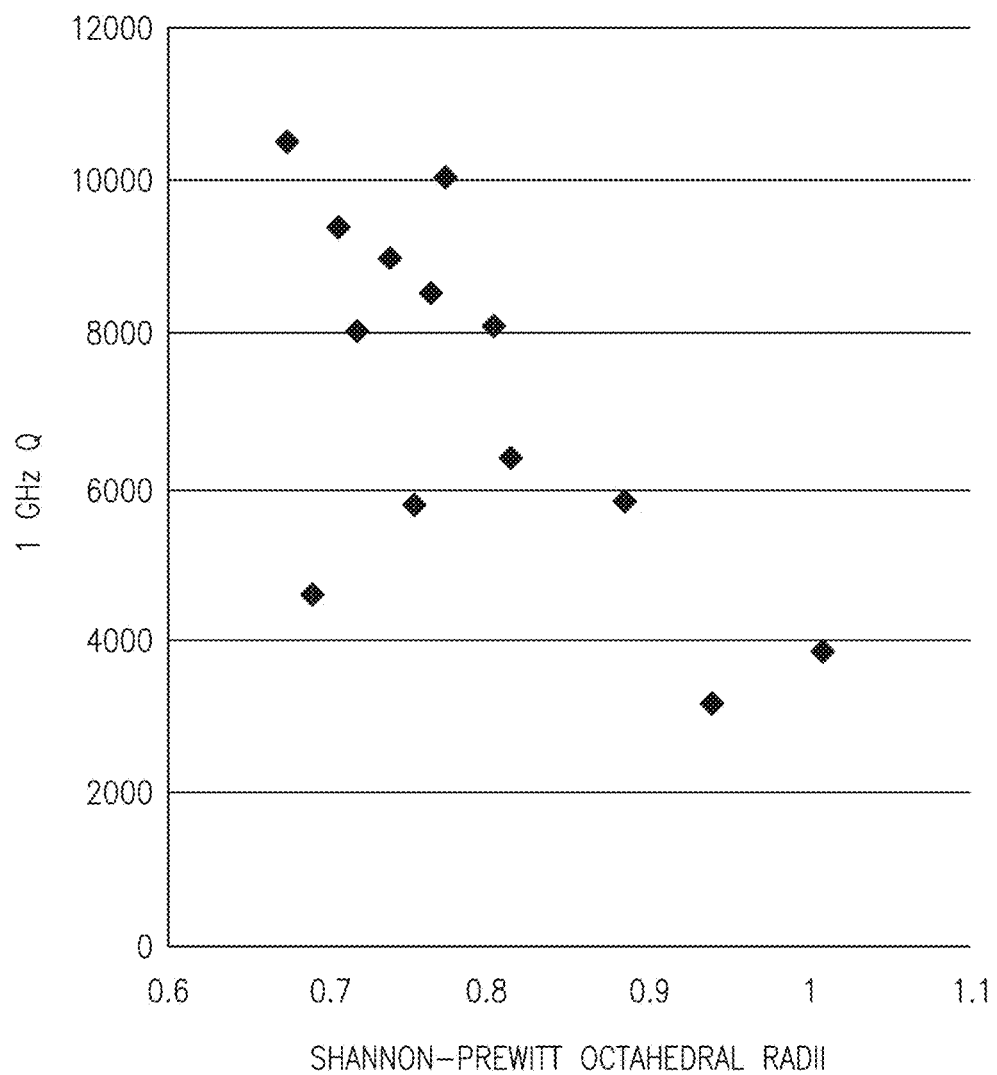
FIG. 4 illustrates the effect of changing the average ionic size on the 1 GHz Q for $Ba_4Nd_{6.16}Sm_{3.4}Ti_{17.32}Al_{0.68}O_{54}$.
Figure 5:
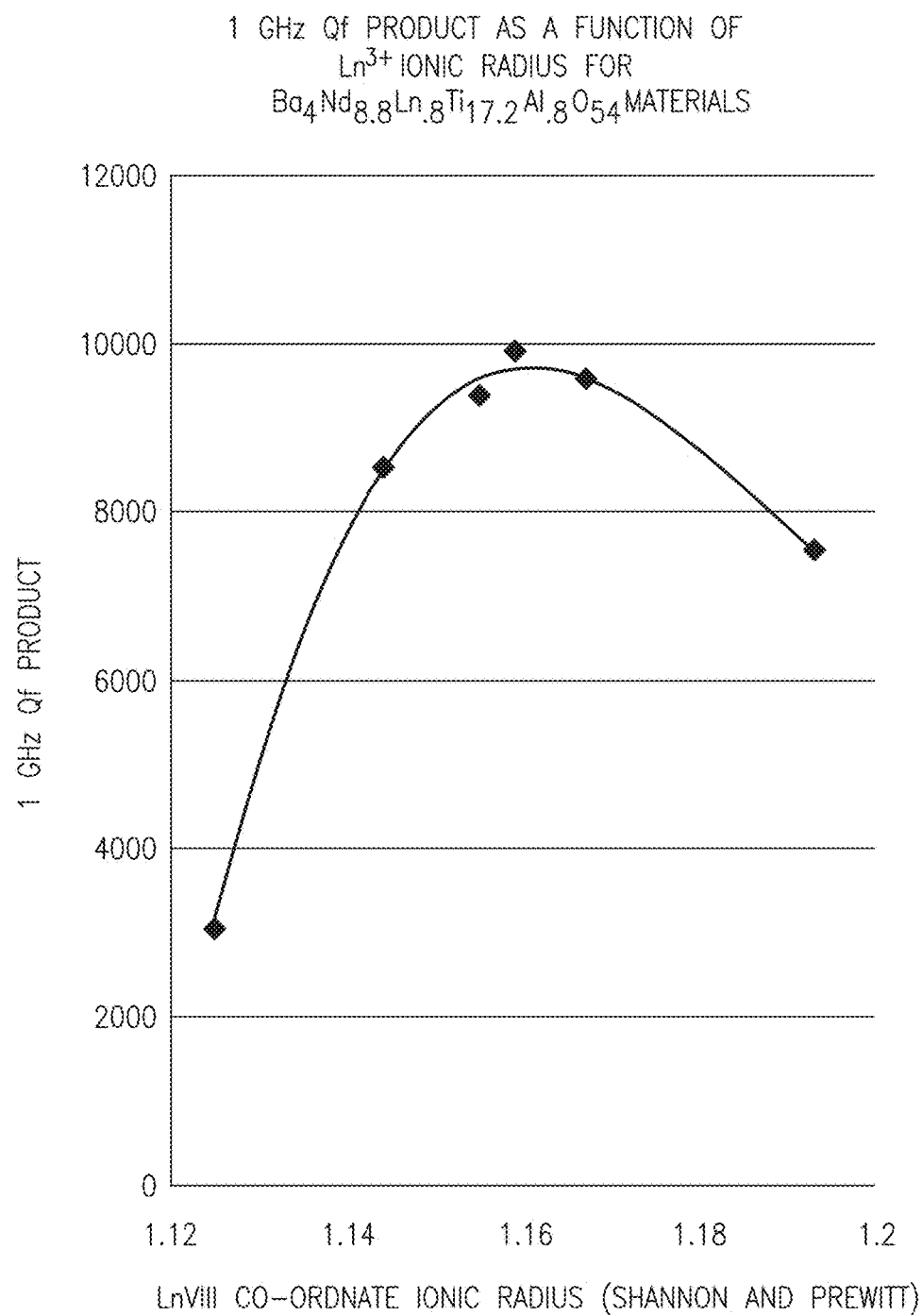
FIG. 5 illustrates the 1 GHz Q as a function of $Ln^{3+}$ ionic radius for $Ba_4Nd_{8.8}Ln_{0.8}Ti_{17.2}Al_{0.8}O_{54}$.
Figure 6:
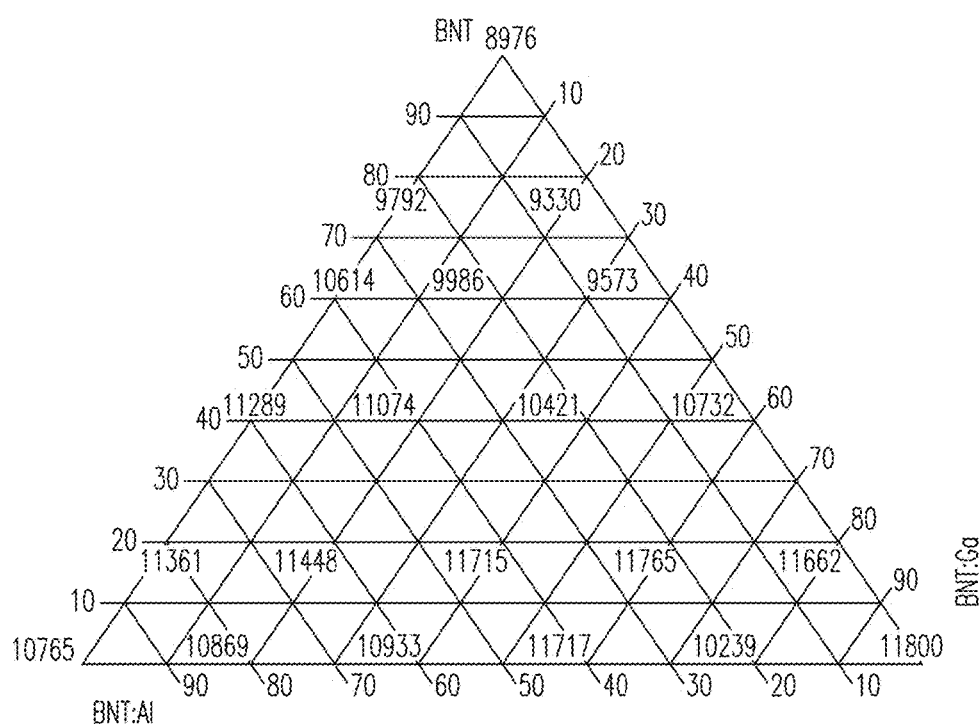
FIG. 6 illustrates the 1 GHz Q as a function of a ternary composition of BaNdTiGaO and BaNdTiAlO systems.

Without being bound by theory, it is believed that for certain tungsten bronze crystal ceramic systems such as:

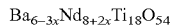

$$Ba_{6-3x}Nd_{8+2x}Ti_{18}O_{54}$$

with x<2/3, substituting strontium (ionic radius=1.35) for barium (ionic radius=1.56) can improve the physical characteristics when there are greater than 4 formula units of barium within the crystal structure, as this substitution makes the A sites closer in size to the lanthanide ions which currently occupy that crystallographic site (ionic radius ranges from 1.3-1.19). In some embodiments, x can be 0 (or about 0). In some embodiments, x can be greater than 0. FIGS. 4 and 5 illustrate how changing the ionic radius in a crystal structure can have a drastic effect on Q. Based in part on these premises, a framework for designing a variety of different compositions and dielectric materials with improved Q can be developed. In some embodiments, Q begins at a low value for values of x near 0 and increases as a function of $Ln^{3+}$ amount. However, Q decreases rapidly after reaching an x value of approximately 2/3. This effect is most likely because at x=2/3, the crystal structure contains the lowest strain due to the properly sized atoms contained within the crystal structure. FIG. 6 illustrates how changing compositions of improved Q ceramic materials can have a drastic effect on Q values, depending on the relative percentages of the elements within the structure.

Ceramic Material Compositions with Enhanced Q

Certain embodiments of the disclosure relate to modified ceramic material compositions with enhanced Q useful in electronic devices operating in the radio frequency range. Other physical characteristics such as $\in_r$, and $\tau_F$ can be improved as well. These physical characteristics can be manipulated by adding or changing elements within a given crystal structure.

Some embodiments can involve dielectric compositions having a primary phase comprising the modified dielectric ceramic materials, and one or more additional phases comprising a material that modifies one or more physical properties of the primary dielectric ceramic material. For example, the dielectric composition can have a second phase with a material selected from the group consisting of $BaTi_4O_9$, $Ba_2Ti_9O_{20}$, $TiO_2$, and $Nd_2Ti_2O_7$. The relative amounts of the each of the one or more additional phases can be less than or equal to 10 wt % (or less than equal to about 10 wt %) of the composition.

In some embodiments, the material can be a mixture of the above first phase compositions, along with the second phase composition.

Some embodiments can involve doping or including additives to the modified dielectric ceramic material with one or more doping agents that modify any one of the dielectric properties of the ceramic component, the crystalline morphology or crystal growth characteristic of the bulk body of the dielectric ceramic component, the sintering behavior of the dielectric ceramic material, and the densification behavior of the dielectric ceramic material. For example, one or more metal oxide compounds can be added to a calcined, green dielectric ceramic material prior to forming thereof and prior to sintering of the doped green dielectric ceramic material into a formed dielectric ceramic component. Non-limiting examples of dopants or dopant compounds that can be utilized in the one more embodiments of the present disclosure include, but are not limited to, manganese oxide and cerium oxide. In some implementations, the composition includes doping small amounts, preferably about 1% by weight, of cerium, manganese, copper, zinc, niobium, silicon, tin, zirconium, germanium, or combinations thereof as a sintering aid or to adjust the lattice parameter to optimize Q.

Incorporation of Tantalum into Crystal Structure

Disclosed herein are embodiments of high dielectric materials that can be temperature compensated by having low temperature coefficients of resonant frequency. For low frequency (700 MHz-1 GHz) applications, though not limited to these frequencies, it can be advantageous for materials to have dielectric constants above 60 and optimized Q (Qf product >1000 in the 7000 MHz to 1 GHz) that have near zero temperature coefficient of resonant frequency (e.g., are temperature compensated and the properties minimally change with temperature changes). Previous materials that have been used can be found in U.S. Pat. Nos. 8,318,623 and 9,328,029, the entirety of each of which is hereby incorporated by reference. These can include materials that have an orthorhombic tungsten bronze structure such as discussed in detail above.

For example, compounds with an orthorhombic tungsten bronze structure with the general formula $Ba_{6-3x}Ln_{8+2x}Ti_{18}O_{54}$ (Ln=a lanthanide, for example La, Ce, Pr, Nd, Sm or Gd) have been implemented for commercial microwave dielectric applications due to their high dielectric constants (60-100) and their ability to be tuned to a near zero temperature coefficient of resonant frequency. However, it can be advantageous to minimize the dielectric loss tangent or to maximize the Q of the material used for microwave dielectric applications since this leads to sharper resonances and sharper transitions for filter applications.

From a crystallographic perspective, the material can be described as $[A2]_4[A1]_{10}Ti_{18}O_{54}$. The 10 A1 sites are rhombic while the 4 A2 sites are pentagonal. The Ti atoms occupy octahedral sites. The A1 sites may be occupied by Ba atoms, Ln atoms or may be vacant. The A2 atoms may be occupied by Ba or Ln atoms. In some embodiments, the Q can be optimized at an x value of ⅔ (0.667) wherein all of the Ba atoms can reside in the rhombic A2 sites and all of the Ln atoms reside in the A1 sites. In some embodiments, the Ln chosen can be Sm to maximize Q which can decrease with increasing lanthanide size in the order Nd, Pr, Ce and La. The Gd material can have a low Q as well. The Sm version is the only one of the series with a negative temperature coefficient of resonant frequency (° F.). The Nd, Pr, Ce and La series all show positive ° F. values. Therefore, in some embodiments blends of two lanthanides such as Sm and Nd or Sm and La can be used to achieve temperature compensated ceramic bodies.

U.S. Pat. Nos. 8,318,623, 5,182,240, 5,185,304 and 5,310,710, all of which are hereby incorporated by reference in their entirety, teach that aluminum may be substituted for titanium and the charge may be compensated by Ln material in the A1 site if the Ln is Nd, a mixture of Nd and Sm, a mixture of Nd and Y or a mixture of Sm and the non-lanthanide Bi. In some embodiments, x values <0.67 where Ln=Nd (in the BaO—$Nd_2O_3$—$TiO_2$ ternary system) for the $Ba_{6-3x}Nd_{8+2x}Ti_{18}O_{54}$ phase is chemically compatible with the high Q rutile form of $TiO_2$ (with a temperature coefficient of resonant frequency >500 ppm/° C.).

However, disclosed herein are embodiments of materials that include tantalum (Ta) into the crystal structure instead, which can improve properties in the ceramic material. Advantageously, embodiments of the disclosure can reduce the temperature coefficient of the material to near zero, making the material particularly useful in applications with fluctuating temperatures. Further, by including tantalum there may be no need to use rutile as a secondary phase, which can be necessary for other ceramic compositions.

Figure 7:
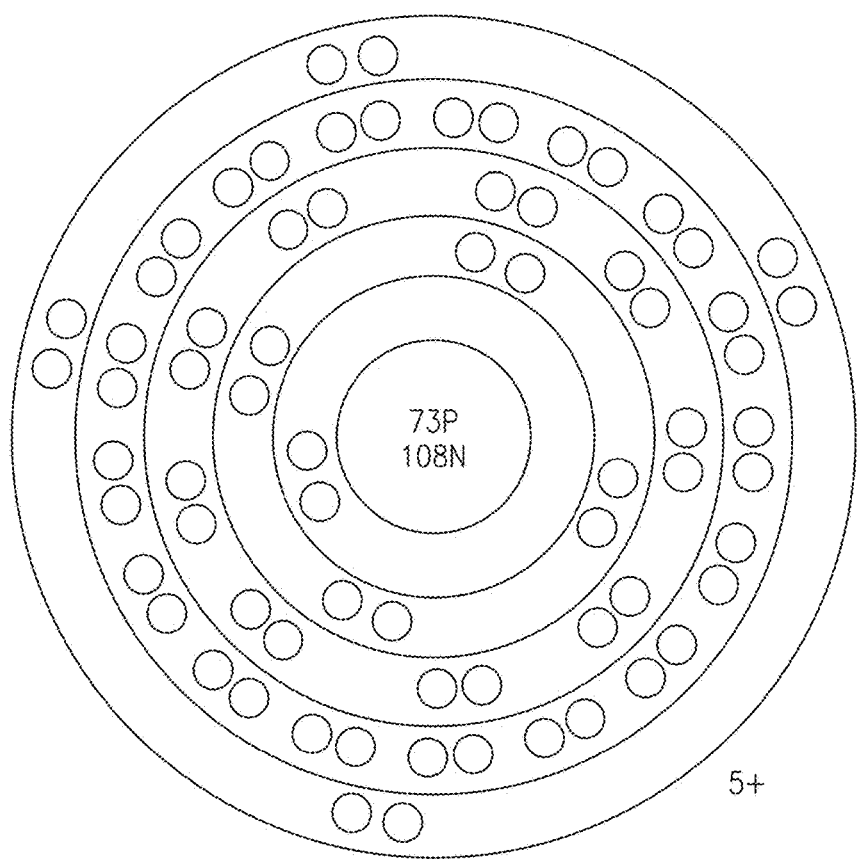
FIG. 7 illustrates a general schematic of a tantalum atom.

Specifically, in some embodiments tantalum can be added into the composition, and thus the orthorhombic crystal structure discussed above. This additional can provide improvements for both the dielectric constant as well as reducing the temperature coefficient of resonant frequency, making the material useful for applications which have variable temperatures throughout operation. An example atom of tantalum is shown in FIG. 7. As shown, tantalum has a significantly positive charge of +5. Thus, charge balancing can be used to insure that the overall charge balance is preserved. Below illustrate different compositions with different charge balancing approaches.

In some embodiments, the material can be formed from a Ba-Ln-Ti—Ta—O system, such as a Ba—Sm—Ti—Ta—O system, though other lanthanides can be used as well. Specifically, embodiments of the material can be described by the formula:

$$Ba_{12}Sm_{28-x}Ti_{54-3x}Ta_{3x}O_{162}$$

In the above formula, 0<x<3 (or about 0<x<about 3). In some embodiments, x is greater than 0. In some embodiments, x is less than 3. The above formula shows an example of charge balancing by removing $Sm^{3+}$ and replacing Ta in the vacant lattice site.

In some embodiments, the material can be described by the formula:

$$Ba_{12+3x}Sm_{28-3x}Ti_{54-3x}Ta_{3x}O_{162}$$

For the above formula, 0<x<3 (or about 0<x<about 3). In some embodiments, x is greater than 0. In some embodiments, x is less than 3. The above formula shows an example of charge balancing by replacing $Sm^{3+}$ with $Ba^{2+}$. In some embodiments, x=0.2, which can give the composition $Ba_{12.6}Sm_{27.4}Ti_{53.4}Ta_{0.6}O_{162}$.

Further, an intermediate composition can be used using both of the above described charge balancing operations. Specifically, compensating for the excess charge can be performed by removing Sm alone, by replacing Sm with Ba, or both. The formula below indicates the "both" with the Ta partitioned between x and y. This can be shown by the formula:

$$Ba_{12+3y}Sm_{28-x-3y}Ti_{54-3x-3y}Ta_{3x+3y}O_{162}$$

For the above formula, 0<x<3 (or about 0<x<about 3). In some embodiments, x is greater than 0. In some embodiments, x is less than 3.

In some embodiments, Nb can be used instead of Ta. In some embodiments, this can be a 1:1 replacement.

Table 1 below illustrates certain embodiments of tantalum substituted orthorhombic tangent bronze structures that can have advantageous properties.

TABLE 1

Ceramic Compositions Including Tantalum

| Composition | Additives | Density (g/cc) | Dielectric Constant | Temp. Co. | Qf (1 GHz) | Qf (3.5 GHz) |
|---|---|---|---|---|---|---|
| $Ba_{12}Sm_{27.8}Ti_{53.4}Ta_{0.6}O_{162}$ | 0.06% $CeO_2$ | 5.78 | 80.39 | 8.1 | 6499 | 7684 |
| $Ba_{12.6}Sm_{27.4}Ti_{53.4}Ta_{0.6}O_{162}$ | 0.06% $CeO_2$ | 5.87 | 84.62 | 2.98 | 7914 | 8953 |
| $Ba_{12}Sm_{27.6}Ti_{52.8}Ta_{1.2}O_{162}$ | 0.06% $CeO_2$ | 5.87 | 83.89 | 18.77 | 6650 | 7930 |
| $Ba_{12.6}Sm_{27.2}Ti_{52.8}Ta_{1.2}O_{162}$ | 0.06% $CeO_2$ | 5.89 | 85.49 | 12.62 | 6556 | 7864 |
| $Ba_{13.2}Sm_{26.8}Ti_{52.8}Ta_{1.2}O_{162}$ | 0.06% $CeO_2$ | 5.89 | 86.35 | 20.32 | 4778 | 5988 |
| $Ba_{12}Sm_{27.4}Ti_{52.2}Ta_{1.8}O_{162}$ | 0.06% $CeO_2$ | | | | 5085 | |
| $Ba_{12.6}Sm_{27.0}Ti_{52.2}Ta_{1.8}O_{162}$ | 0.06% $CeO_2$ | | | | 3901 | |
| $Ba_{13.2}Sm_{26.6}Ti_{52.2}Ta_{1.8}O_{162}$ | 0.06% $CeO_2$ | | | | 937 | |
| $Ba_{13.8}Sm_{26.2}Ti_{52.2}Ta_{1.8}O_{162}$ | 0.06% $CeO_2$ | | | | 765 | |
| $Ba_{12}Sm_{27.2}Ti_{51.8}Ta_{2.4}O_{162}$ | 0.06% $CeO_2$ | | | | 1005 | |
| $Ba_{12.6}Sm_{26.8}Ti_{51.8}Ta_{2.4}O_{162}$ | 0.06% $CeO_2$ | | | | 90 | |
| $Ba_{13.2}Sm_{26.4}Ti_{51.8}Ta_{2.4}O_{162}$ | 0.06% $CeO_2$ | | | | 33 | |
| $Ba_{13.8}Sm_{26.0}Ti_{51.8}Ta_{2.4}O_{162}$ | 0.06% $CeO_2$ | | | | 128 | |
| $Ba_{12.15}Sm_{27.85}Ti_{53.85}Ta_{0.15}O_{162}$ | 0.06% $CeO_2$ | 5.79 | 81.93 | −7.59 | 8712 | 9479 |
| $Ba_{12.3}Sm_{27.7}Ti_{53.7}Ta_{0.3}O_{162}$ | 0.06% $CeO_2$ | 5.75 | 81.55 | −2.92 | 8470 | 9341 |

TABLE 1-continued

Ceramic Compositions Including Tantalum

| Composition | Additives | Density (g/cc) | Dielectric Constant | Temp. Co. | Qf (1 GHz) | Qf (3.5 GHz) |
|---|---|---|---|---|---|---|
| $Ba_{12.45}Sm_{27.65}Ti_{53.55}Ta_{0.45}O_{162}$ | 0.06% $CeO_2$ | 5.74 | 81.54 | 0.25 | 8226 | 9042 |
| $Ba_{12.6}Sm_{27.4}Ti_{53.4}Ta_{0.6}O_{162}$ | 0.06% $CeO_2$ | 5.69 | 80.31 | 2.23 | 7304 | 8422 |
| $Ba_{12.75}Sm_{27.25}Ti_{53.25}Ta_{0.75}O_{162}$ | 0.06% $CeO_2$ | 5.8 | 83.34 | 4.05 | 7338 | 8301 |
| $Ba_{12.15}Sm_{27.8}Ti_{53.7}Ta_{0.3}O_{162}$ | 0.06% $CeO_2$ | 5.82 | 82.03 | -4.47 | 7382 | 9046 |
| $Ba_{12.3}Sm_{27.65}Ti_{53.55}Ta_{0.45}O_{162}$ | 0.06% $CeO_2$ | 5.72 | 80.84 | 0.2 | 8358 | 9191 |
| $Ba_{12.45}Sm_{27.5}Ti_{53.4}Ta_{0.6}O_{162}$ | 0.06% $CeO_2$ | 5.73 | 81.29 | 2.45 | 7887 | 8895 |
| $Ba_{12.6}Sm_{27.35}Ti_{53.25}Ta_{0.75}O_{162}$ | 0.06% $CeO_2$ | 5.71 | 80.89 | 5.27 | 7237 | 8352 |
| $Ba_{12.75}Sm_{27.2}Ti_{53.1}Ta_{0.9}O_{162}$ | 0.06% $CeO_2$ | 5.73 | 81.83 | 7.76 | 6719 | 8100 |
| $Ba_{12.15}Sm_{27.75}Ti_{53.55}Ta_{0.45}O_{162}$ | 0.06% $CeO_2$ | 5.69 | 79.76 | 0.44 | 8191 | 9076 |
| $Ba_{12.3}Sm_{27.6}Ti_{53.4}Ta_{0.6}O_{162}$ | 0.06% $CeO_2$ | 5.84 | 82.62 | 4.07 | 8200 | 9300 |
| $Ba_{12.45}Sm_{27.45}Ti_{53.25}Ta_{0.75}O_{162}$ | 0.06% $CeO_2$ | 5.78 | 82.67 | 5.85 | 8082 | 8767 |
| $Ba_{12.6}Sm_{27.3}Ti_{53.1}Ta_{0.9}O_{162}$ | 0.06% $CeO_2$ | 5.78 | 82.69 | 7.87 | 7242 | 8222 |
| $Ba_{12.75}Sm_{27.15}Ti_{52.95}Ta_{1.05}O_{162}$ | 0.06% $CeO_2$ | 5.81 | 83.41 | 10.08 | 6484 | 7910 |

In some embodiments, cerium oxide ($CeO_2$) can be added into the composition. For example, it can be added in relatively small amounts. In some embodiments, 0.01, 0.02, 0.03, 0.04, 0.05, 0.06, 0.07, 0.08, 0.09, or 0.10% cerium oxide can be added in. In some embodiments, greater than 0.01, 0.02, 0.03, 0.04, 0.05, 0.06, 0.07, 0.08, 0.09, or 0.10% cerium oxide can be added in. In some embodiments, less than 0.01, 0.02, 0.03, 0.04, 0.05, 0.06, 0.07, 0.08, 0.09, 0.10, or 0.15% cerium oxide can be added in. This material has similar properties to manganese, and prevents the reduction of the titanium in the structure. The cerium oxide can sit on the site with the rare earth elements. However, in some embodiments, cerium oxide may not be used. For example, in all of the above listed compositions in Table 1, they may be composed entirely of the composition in the first column, and thus may not have cerium oxide (e.g., 0%).

As shown in the above Table 1, embodiments of the material can have a dielectric constant of greater 60 (or greater than about 60, greater than 70 (or greater than about 70), greater than 80 (or greater than about 80), greater than 81 (or greater than about 81), greater than 82 (or greater than about 82), greater than 83 (or greater than about 83), greater than 84 (or greater than about 84), greater than 85 (or greater than about 85), or greater than 86 (or greater than about 86). In some embodiments, the dielectric constant can be 80 (or about 80). In some embodiments, the dielectric constant can be below 90 (or below about 90), below 88 (or below about 88), below 86 (or below about 86), below 85 (or below 85), below 84 (or below about 84), below 83 (or below about 83) or below 82 (or below about 82). In some embodiments, the dielectric constant can be inclusively between any of the above disclosed minimums with a maximum dielectric constant of 86 (or about 86), 90 (or about 90), or 100 (or about 100).

Further, embodiments of the material can have a temperature coefficient of resonant frequency of less than 20 (or less than about 20), less than 10 (or less than about 10), less than 5 (or less than about 5), or less than 1 (or less than about 1). In some embodiments, the temperature coefficient can be 0 (or about 0). In some embodiments, the temperature coefficient of resonant frequency can be at 0 (or about 0) or greater. In some embodiments, the temperature coefficient of resonant frequency can be at 1 (or about 1) or greater. In some embodiments, the temperature coefficient of resonant frequency can be at 2 (or about 2) or greater.

Embodiments of the material can have a temperature coefficient of resonant frequency of greater than −20 (or greater than about −20), greater than −10 (or greater than about −10), greater than −5 (or greater than about −5), or greater than −1 (or greater than about −1). In some embodiments, the temperature coefficient of resonant frequency can be at −1 (or about −1) or less. In some embodiments, the temperature coefficient of resonant frequency can be at −2 (or about −2) or less.

In some embodiments, the material can have a Qf at 1 GHz of at least 6000 (or at least about 6000), at least 7000 (or at least about 7000), or at least 8000 (or at least about 8000). In some embodiments, the material can have a Qf at 3.5 GHz of at least 7000 (or at least about 7000), at least 8000 (or at least about 8000), or at least 9000 (or at least about 9000). In some embodiments, the Qf at 1 GHz can be inclusively between any of the above disclosed minimums with a maximum Qf at 1 GHz of 8000 (or about 8000), 9000 (or about 9000), or 10000 (or about 1000). In some embodiments, the Qf at 3 GHz can be inclusively between any of the above disclosed minimums with a maximum Qf at 3 GHz of 9000 (or about 9000), 10000 (or about 1000), 1100 (or about 1100), or 1200 (or about 1200).

One advantageous improvement through the use of tantalum is the avoidance of adding a secondary phase (rutile) to balance out the charges. This can make the material less complex to manufacture as there are less components.

Processing

Figure 8:
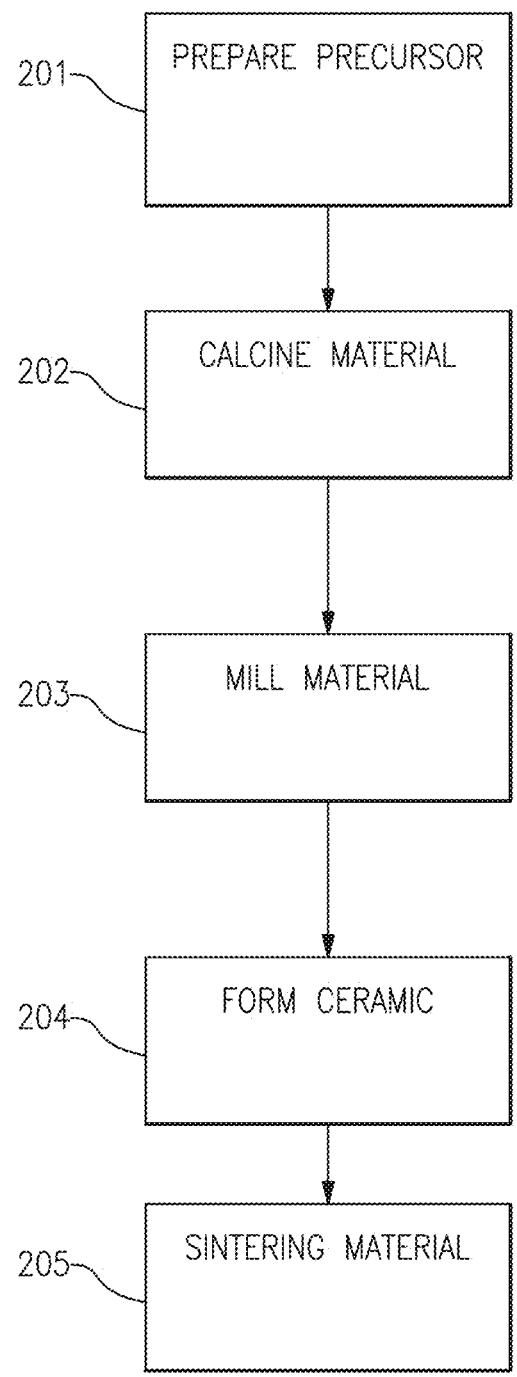
FIG. 8 provides a flow diagram illustrating a method of preparing the compositions of certain embodiments.

FIG. 8 illustrates the fabrication process which typically involves providing or preparing a mixture of precursor compounds 201. In some embodiments the precursor comprises, but is not limited to, $BaCO_3$, $TiO_2$, $Ln_2O_3$, $Al_2O_3$, $NaHCO_3$, and $Ga_2O_3$. In another embodiment, the precursor comprises, but is not limited to, $BaCO_3$, $TiO_2$, $Ln_2O_3$, $Al_2O_3$, $GeO_2$, $ZrO_2$, $SnO_2$, $MnO_2$, $CeO_2$, and other oxides. The relative amounts of the precursor compounds can be provided to result in improved Q ceramic composition with a single primary phase, not including any other additional phases which could adversely affect the physical properties of the material. However, in some embodiments, the material will contain a primary phase along with one or more secondary phases. Embodiments with an additional phase, which can be present between the primary phase grains, can be implemented by incorporating greater than stoichiometric amounts of each of the one or more corresponding precursor compounds in the mixture. Other phases can be incorporated into the structure by the addition of rutile or perovskite. All of these secondary phases can have drastic effects on the physical characteristic of a material, such as the Q, the temperature coefficient of resonant frequency, and the dielectric constant.

After the precursor is formed, the mixture of precursor compounds is then typically dry or wet blended until the mixture is homogeneous. Blending can be performed by any one or more of propeller mixing, ball milling, and vibratory milling, along with any other blending known to one skilled in the art.

If wet blending is used, the wet blended mixture is typically dried by either spray drying or by pan drying until it has a desired viscosity or slump characteristics. For example, drying can be performed until the resultant mixture no longer behaves as a slurry, but instead as a material with a higher viscosity. Although drying is preferred when wet blending is used, the mixture may still contain as much as, or greater than, 75 wt. % of water or the blending agent. Drying can be performed by pan drying the mixture at a temperature that vaporizes the liquid agent or the water, e.g., at a temperature in a range of about 50° C. to about 300° C., such as at about 200° C.

Reaction of the precursor compounds into the orthorhombic tungsten bronze improved Q ceramic material can be promoted by calcining the blended mixture in an oven 202. The material is calcined by raising the oven temperature at a rate in a range from about 5° C. per hour to about 300° C. per hour in one or more heat soaking periods. Preferably, the heating ramp rate is in a range of between about 50° C. per hour to about 150° C. per hour. The one or more heat soaking periods can be performed at an oven temperature in a range of between about 1000° C. to about 1400° C. The preferred heat soaking temperature can vary depending on, for example, the composition of the improved Q dielectric ceramic material product and, in some cases, the type of precursor compound. A non-limiting preferred heat soaking temperature is in a range of between about 1150° C. and about 1200° C. Heat soaking temperatures below about 1000° C. may not sufficiently promote reaction into the appropriate structure, which can result in unreacted phases in the composition, leading to materials that underperform. Heat soaking temperatures above about 1,400° C. may cause melting, at least partially, of the barium neodymium titanate lattice structure, which can result in incomplete incorporation of the modifying elements in the orthorhombic tungsten bronze lattice. Heat-treating at the heat soaking temperature can be performed until the reaction has sufficiently progressed to form the improved Q ceramic material. For example, heat soaking can be performed for a period in a range from about two hours to about sixteen hours, preferably in a range of between about four hours and about twelve hours, more preferably for about eight hours. The duration of the heat soaking or calcining period may depend on the element composition of the improved Q ceramic material, and, in some cases, the relative compositions of the modifiers in the material as well as the amount of modifiers added into the material. Depending on, for example, the improved Q ceramic material product, calcining periods of less than about four hours may not sufficiently react or convert the precursor compounds into green material reaction process. Further, the next steps in synthesizing the material can involve cooling the material that has at least partially reacted into green material to about room temperature, typically about 20° C. to about 25° C. Cooling can be performed at a rate in a range of from about 5° C. per hour to about 600° C. per hour. For example, cooling can be performed by reducing the temperature of the oven containing the green material at a rate of about 100° C. per hour.

The green material is typically milled, ground, or comminuted to particles 203 with a target dimension or diameter by ball milling, attrition milling, or vibratory milling with, for example, 5 mm diameter balls of yttria-stabilized zirconia, magnesia-stabilized zirconia, and/or ceria-stabilized zirconia. Water or an inert carrier fluid, such as acetone, can be used to facilitate milling and achieve the desired material size. For example, milling can be performed to provide particles with an average diameter in a range from about 0.5 microns to about 10 microns. If advantageous to do so, particles with less than a predetermined threshold dimension, or diameter, can be separated by, for example, sieving. The particles of the improved Q ceramic material can be spherically shaped or substantially spherically shaped, depending on the comminuting of the material. However, one or more aspects of the present disclosure can be practiced with non-spherical shapes. Indeed, some embodiments of the present disclosure use an aggregation of particles having differing shape or size characteristics, or both, to create different physical characteristics. For substantially spherical particles, the nominal diameter can be considered as the equivalent diameter of a hypothetical sphere having the same volume as the particle. Thus, the average nominal diameter can be considered an average equivalent diameter of hypothetical spherical particles having the same volume.

The comminuted green particles can then be formed into a green improved Q member 204. Forming can be accomplished by any of pressing, such as uniaxial pressing, cold isostatic pressing, extruding, hot isostatic pressing with an inert gas, hand die pressing, or by any other technique known to persons of ordinary skill in the art.

A binder, for example about less than 2 wt. %, may be added to the green particles to facilitate formation of the green member. The amount of binder may vary depending on, for example, the type of binder and the physical characteristics of the particles, such as, but not limited to particles size and the granularity of the particles. Too much binder, however, may change the density of the material and create gaps in the component. A non-limiting example of a binder that can be used is polyvinyl alcohol. To further facilitate the forming procedure, one or more plasticizers, such as polyethylene glycol, may be utilized with the binder. The amount of the plasticizer utilized may similarly be dependent on the type of binder and the physical characteristics of the particles.

Forming the particles into a desired component can be effected to provide a shaped article having a density that is at least about 50% of the theoretical density of the final improved Q ceramic material. For example, the particles can be pressed at a pressure of at least about 2,000 psi, for example, at about 40,000 psi. Pressing the material at this pressure would typically provide formed green improved Q members having a density that is at least about 55%, typically between about 55% and about 65%, of the theoretical density of the improved Q ceramic material.

One or more dopant compounds may be added to the material prior to milling the green material or prior to forming the green improved Q member, or both. Preferably, adding the one or more dopant compound involves, for example, mixing such dopant compound with the green material, and then milling the mixture thereof to the appropriate size. However, mixing the one or more dopant compounds may also involve mixing with the particles having the maximum threshold dimensions.

As noted, in embodiments comprising one or more phases, material of the second phase may be added to the green material. As with the one or more dopant compounds, the one or more second phase precursor compounds may be added prior to grinding or comminution of the green material.

Figure 9:
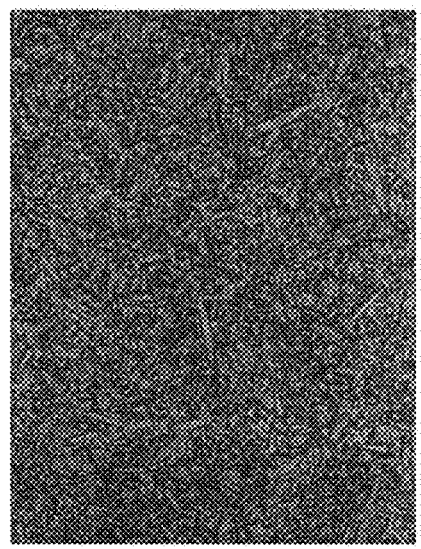
FIG. 9 illustrates the microstructure sintered ceramic.

FIG. 9 illustrates how the microstructure of improved Q materials shows elongated grains once properly sintered. The green improved Q member, which can optionally have the one or more second phase precursor compounds and the one or more dopant compounds, can be sintered into an improved Q component, which can be useful for electronic applications, such as in the field of radio frequency. Sintering can be performed in an air or oxygen-containing atmosphere for a period and at a temperature, or for a plurality of durations and the same or at various temperatures. Modifications to the time and temperature can effect densification of the material and, in some cases, to complete the solid state reaction. Some embodiments of the disclosure can involve sintering to provide particular material or physical characteristics, such as improved Q levels. In some implementations, the temperature and oxygen pressure depend on the composition of the material. For example, sintering can be performed at one or more conditions that provide preferred grain characteristics or crystal structures, such as an orthorhombic tungsten bronze crystal structure. Sintering can be performed by heating or exposing the green member to one or more sintering temperatures with certain heating rates. The shape and geometry of the member and its physical and physical properties may affect the effective heat transfer behavior of the member. Thus, for example, the heating rate can depend on the shape of the member and the thermal conductivity of the material. In non-limiting embodiments of the disclosure, heating can be performed at a rate that is in the range of about 50° C. per hour to about 200° C. per hour. The size, shape, and composition of the material may also influence the duration of the sintering temperature. Thus, depending on at least such factors, one or more sintering temperatures may be used and the one or more durations of exposure at such temperature, or at a plurality of temperatures, can be in a range from about 1,350° C. to about 1,550° C. The sintering duration at can be performed for corresponding sintering durations that are in a range of from about one hour to about ten hours, preferably, in a range of about three to about eight hours. Steps after sintering typically further involve cooling the improved Q ceramic material at one or more suitable cooling conditions. For example, cooling can involve reducing the temperature of the improved Q ceramic material, or the environment thereof, to about room temperature of about 25° C., at a rate in a range of from about 100° C. per hour to about 300° C. per hour. Like the heating rate, the cooling rate can also advantageously be performed in separate stages or steps. Such embodiments of the disclosure may be appropriate to avoid or reduce the likelihood of fracturing or cracking of the improved Q ceramic component because of thermal shock due to a quick change in temperatures. For example, a preferred cooling rate, which can depend on considerations such as the geometrical configuration, the thermal conductivity, and the coefficient of thermal expansion of the material, can be performed at a rate of about 150° C. per hour. Sintering can thus provide a component that has a density, such as a target density, of at least about 95% of the theoretical density of the improved Q ceramic material.

The improved Q component may then be finished or machined to have desirable features or dimensions or to remove undesirable portions created during the formation process. For example, machining can involve creating one or more openings in the body of the component.

One or more further aspects of the present disclosure can be directed to repairing or modifying electronic devices, such as RF devices, to incorporate any one or more of the improved Q ceramic materials of the present disclosure. For example, the present disclosure can be directed to removing a ceramic resonator of an electronic devices and either retrofitting or installing a replacement resonator comprising an improved Q ceramic material having one of the formulas recited herein.

Applications

One or more embodiments of the present disclosure provide a framework to develop real world devices in the field of electronics, including, but not limited to, radio frequency. Electronic components used in radio frequency preferably have improved Q, a high dielectric constant, and a temperature coefficient of resonant frequency near 0. Embodiments of the present disclosure provide for a ceramic material having such desirable qualities.

Figure 10:
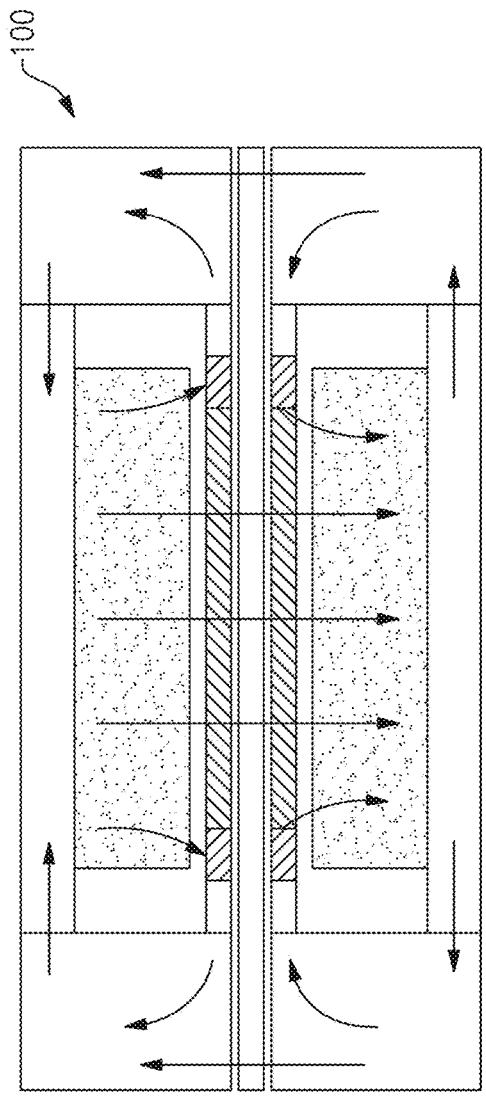
FIG. 10 illustrates a circulator which can be configured to function as a resonator and utilize certain embodiments.

Materials formed in accordance with embodiments of the present disclosure have applications in electronic devices, such as ceramic antennas and resonators. FIG. 10 illustrates a resonator/circulator 100 that the improved Q material according to preferred embodiments of the present disclosure can be used to create. Specifically, embodiments of the disclosure can be used as a dielectric ring for a resonator/circulator, such as around a magnetic material. In some embodiments, the material can be used for glued or co-fired composite assemblies.

Figure 11:
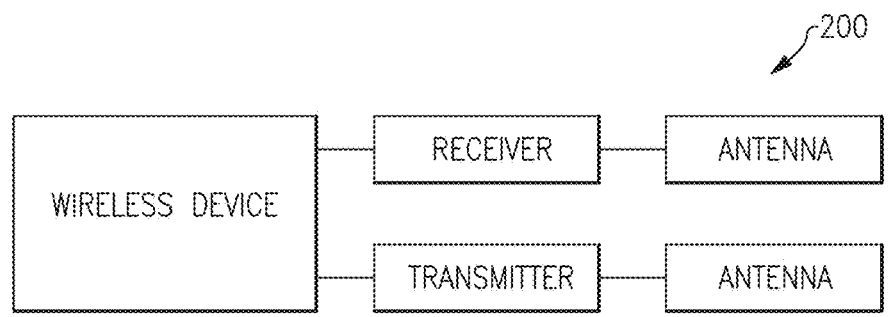
FIG. 11 illustrates a schematic of an antenna system in which certain embodiments are used.
Figure 12:
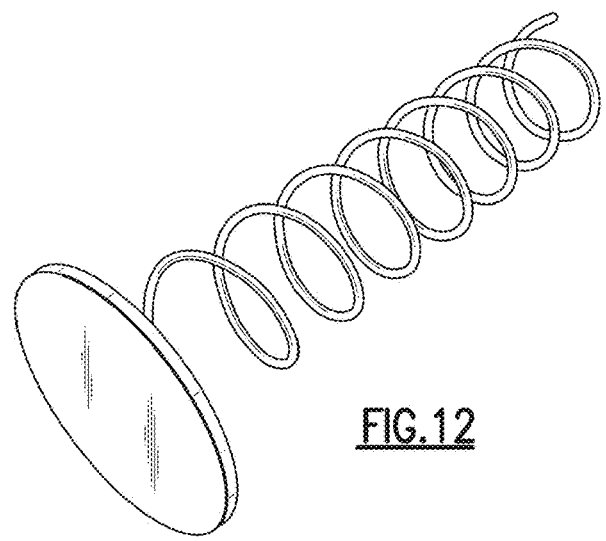
FIG. 12 illustrates an example helical antenna.
Figure 13:
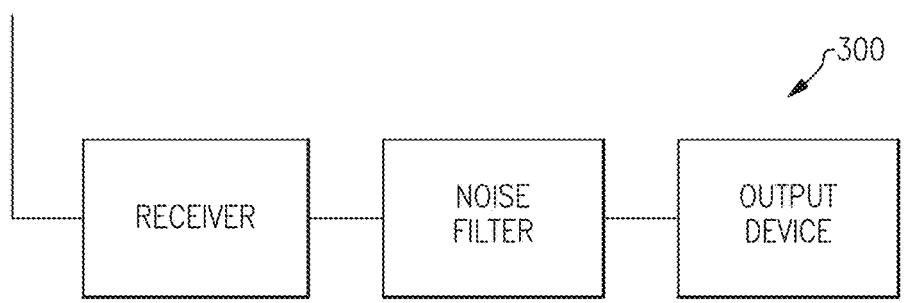
FIG. 13 illustrates a schematic of a filtering system in which certain embodiments are used.

FIG. 11 diagrams an antenna system 200 in which the material can also be used to create the antenna and other components. Certain embodiments of the present disclosure are especially useful in helical antennas such as shown in FIG. 12. Certain embodiments of the present disclosure can be used in the formation of noise filtration system 300 shown in FIG. 13 filters for cellular communicators, such as, but not limited to, TE and TM mode filters. Embodiments of the present disclosure can also be used in components of advanced 3G, 4G, and 5G filtering for wireless data streaming, as well as in components supporting LTE platforms. The present disclosure may also considerably expand the number of improved Q ceramic dielectric materials available for cellular phones, biomedical devices, and RFID sensors. One skilled in the art would understand that using embodiments of the present disclosure in modifying devices in other fields, such as electronics or microwaves, would provide useful physical characteristics in those fields.

From the foregoing description, it will be appreciated that inventive products and approaches for ceramic materials are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A ceramic material comprising:
Ba, Sm, Ti, Ta, and O having a tungsten bronze crystal structure, the ceramic material having a dielectric constant of at least 60, and temperature coefficient of resonant frequency of less than 15, and a Qf at 1 GHz of at least 7000.

2. The ceramic material of claim 1 wherein the ceramic material contains no aluminum.

3. The ceramic material of claim 1 wherein the ceramic material has a dielectric consent of at least 80.

4. The ceramic material of claim 1 wherein the temperature coefficient of resonant frequency of the ceramic material is less than 5.

5. The ceramic material of claim 1 wherein the ceramic material has a Qf at 1 GHz of at least 8000.

6. A ceramic material having a high dielectric constant while maintaining a low temperature coefficient of resonant frequency, the ceramic material comprising:
a chemical formula $Ba_{12+3x}Sm_{28-3x}Ti_{54-3x}Ta_{3x}O_{162}$, x being between 0 and having
a tungsten bronze crystal structure.

7. The ceramic material of claim 6 wherein the ceramic material has a chemical formula of $Ba_{12.6}Sm_{27.4}Ti_{53.4}Ta_{0.6}O_{162}$.

8. The ceramic material of claim 6 wherein the ceramic material has a dielectric constant of at least 60 and a temperature coefficient of resonant frequency of less than 15.

9. The ceramic material of claim 8 wherein the temperature coefficient of resonant frequency is less than 5.

10. The ceramic material of claim 6 wherein the ceramic material has no rutile or perovskite phase.

11. The ceramic material of claim 6 wherein the ceramic material has a Qf at 1 GHz of at least 7000.

12. The ceramic material of claim 6 wherein the ceramic material has a Qf at 1 GHz of at least 8000.

13. The ceramic material of claim 1 wherein the ceramic material has no rutile or perovskite phase.

14. The ceramic material of claim 1 wherein the ceramic material has a Qf at 1 GHz of at least 7000.

15. A ceramic material having a high dielectric constant while maintaining a low temperature coefficient of resonant frequency, the ceramic material comprising a chemical formula of $Ba_{12.6}Sm_{27.4}Ti_{53.4}Ta_{0.6}O_{162}$.

16. The ceramic material of claim 15 wherein the ceramic material has a tungsten bronze crystal structure.

17. The ceramic material of claim 15 wherein the ceramic material has a dielectric constant of at least 60 and a temperature coefficient of resonant frequency of less than 15.

18. The ceramic material of claim 17 wherein the temperature coefficient of resonant frequency is less than 5.

19. The ceramic material of claim 15 wherein the ceramic material has no rutile or perovskite phase.

20. The ceramic material of claim 15 wherein the ceramic material has a Qf at 1 GHz of at least 8000.

* * * * *

UNITED STATES PATENT AND TRADEMARK OFFICE
CERTIFICATE OF CORRECTION

PATENT NO. : 10,315,959 B2  
APPLICATION NO. : 15/714934  
DATED : June 11, 2019  
INVENTOR(S) : Michael David Hill Page 1 of 1

It is certified that error appears in the above-identified patent and that said Letters Patent is hereby corrected as shown below:

In the Drawings

On Sheet 4 of 9, FIG. 5, (X-axis), Line 2, change "CO-ORDNATE" to --CO-ORDINATE--.

In the Claims

In Column 16, Line 16, Claim 3, change "consent" to --constant--.

Signed and Sealed this  
Twenty-sixth Day of November, 2019

Andrei Iancu  
*Director of the United States Patent and Trademark Office*